Nov. 20, 1951  W. A. HIGINBOTHAM ET AL  2,575,759
COUNTER CHRONOGRAPH
Filed Feb. 7, 1949  2 SHEETS—SHEET 2

WITNESSES

INVENTORS
William A. Higinbotham
Boyce D. McDaniel
BY
Roland A. Anderson
Attorney Patented Nov. 20, 1951

2,575,759

UNITED STATES PATENT OFFICE 2,575,759

COUNTER CHRONOGRAPH

William A. Higinbotham, Upton, and Boyce D. McDaniel, Ithaca, N. Y., assignors to the United States of America as represented by the United States Atomic Energy Commission Application February 7, 1949, Serial No. 75,048

1 Claim. (Cl. 175—381)

The present invention relates to electronic chronographs and more particularly to control means operable to permit activation or deactivation of such chronographs in a predetermined manner.

Electronic timing circuits or chronographs as known heretofore have generally included a source of constant frequency impulses, an electronic counting circuit and associating these components a control circuit which, in response to a predetermined externally derived signal, permits said constant frequency impulses to reach the counter circuit, and in response to a second externally derived signal, to stop the counting of said impulses. Such systems are disclosed for example in Cook, U. S. Patent 2,332,300 and in the co-pending U. S. patent application of Sands, Serial No. 606,406, filed July 21, 1945.

It is an object of the present invention to provide simplified, quick acting, control means for counter chronograph systems.

It is a further object of the present invention to provide control means for electronic counter chronographs which automatically resets the system for successive timing operations.

Still another object of the present invention is to provide a simply constructed precise electronic chronograph for measuring time intervals of the order of hundreds of microseconds.

Other objects and advantages of the present invention will be apparent from the following specification taken in connection with the drawings made a part hereof, and the description of a presently preferred embodiment.

Figure 1:
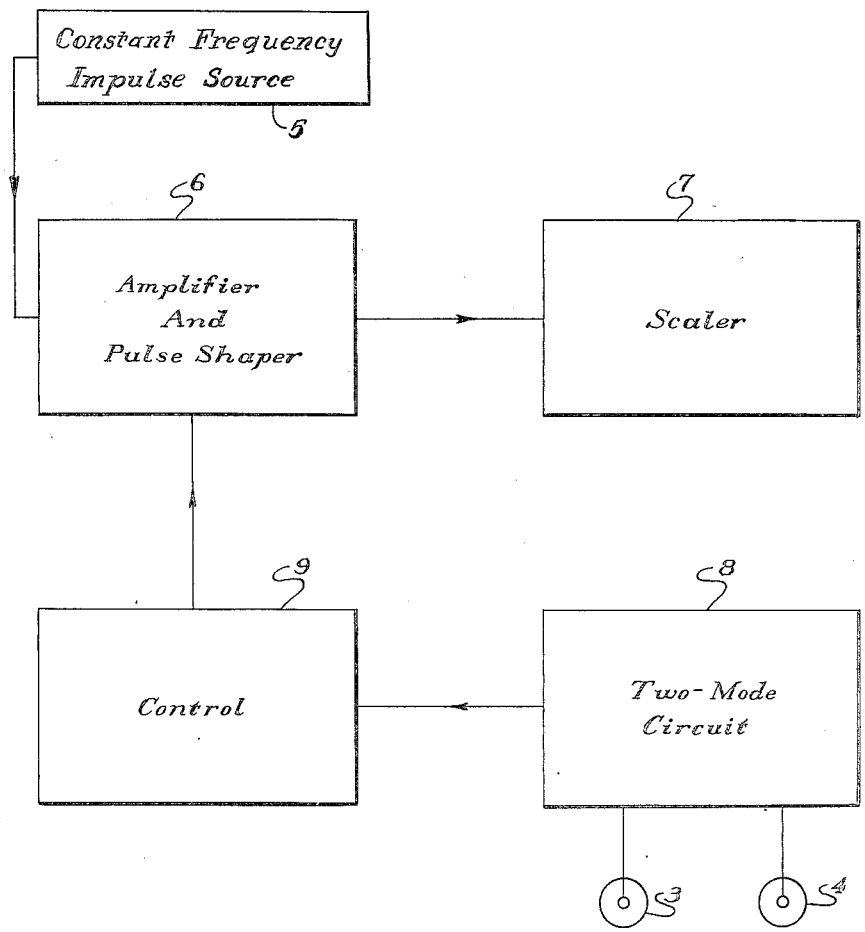
Fig. 1 is a functional diagram in block form of a counter chronograph constructed in accordance with the principles of the present invention.

Referring to Fig. 1, the electronic chronograph of the present invention is seen to comprise a source 5 of constant frequency impulses associated through a controlled pulse shaper 6 with a frequency dividing circuit or scaler 7.

Pulse shaper 6 is controlled in accordance with the condition of balance of a two mode circuit 8 and the reflection of said condition of balance in the control device 9. Means for introducing an initiating and terminating signal are designated by reference numerals 3 and 4 respectively and are shown associated with two mode circuit 8.

Figure 2:
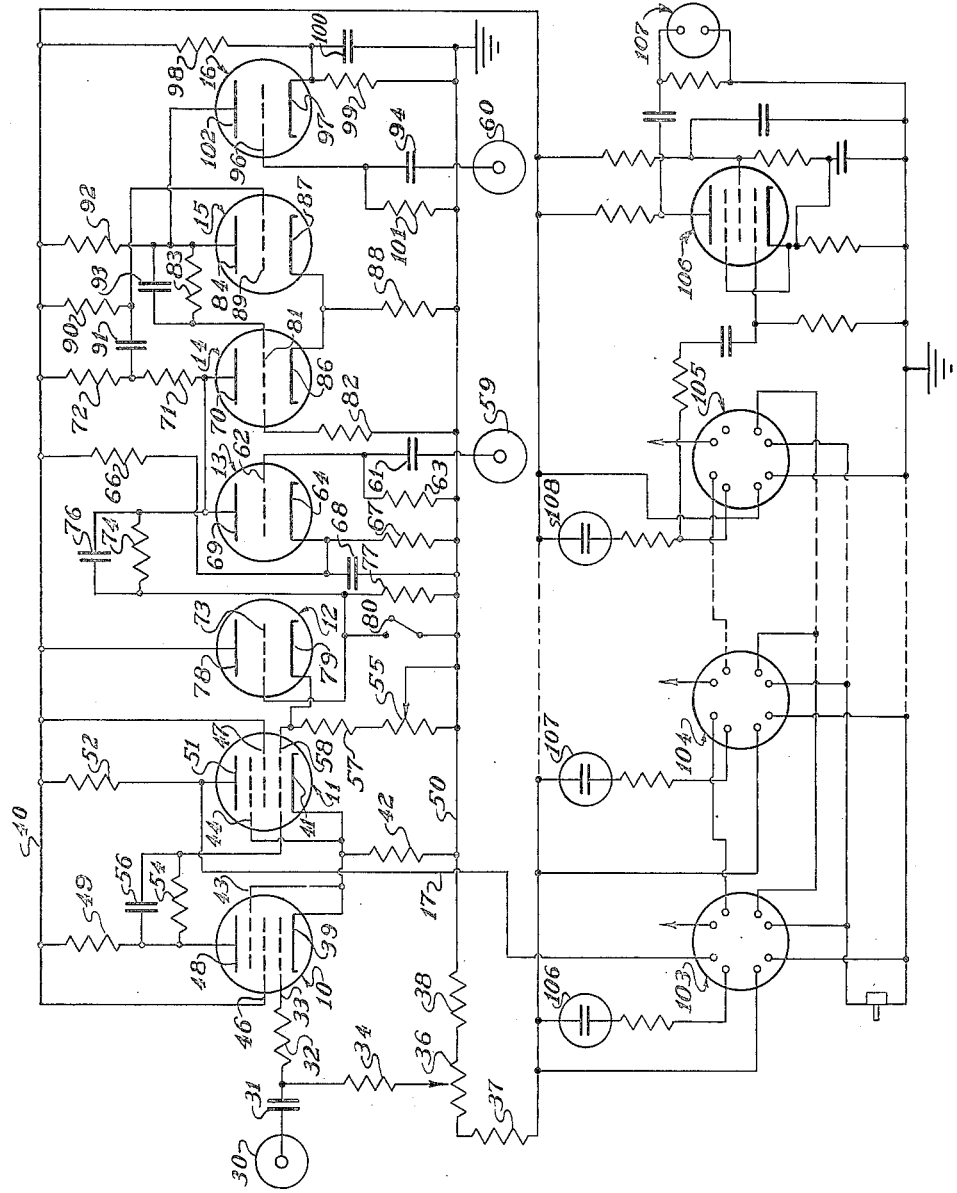
Fig. 2 is a schematic circuit diagram of a chronograph showing details of the invention.

Turning now to Fig. 2, the source of constant frequency impulses is not shown as such but is indicated by input terminal 30. Such impulses are fed through condenser 31 and resistor 32 to the control grid of pentode type tube 10. Tube 10 and tube 11 are associated in a well known trigger circuit manner and together form the pulse shaper 6 of Fig. 1. More particularly, cathodes 39 and 41 and suppressor grids 43 and 44 are connected together and are connected to ground 50 through resistor 42. Screen grids 46 and 47 are connected directly to a source of positive potential indicated by conductor 40. Anodes 48 and 51 are connected to potential conductor 40 through resistors 49 and 52, respectively; furthermore, anode 48 of tube 10 is coupled to grid 58 of tube 11 through the network including resistor 54 and capacitor 56. Grid 58 is also connected to ground through fixed resistor 57 and variable resistor 55. Likewise, input grid 33 of tube 10 is connected to ground and conductor 40 through the voltage divider, including resistors 36, 37, 38 and 34. With this arrangement grid 33 is maintained at a potential which will keep tube 10 cut off except for some portion of the oscillatory input to terminal 30. (It should be noted here that in this particular circuit, grid 33 never becomes positive with respect to cathode 39 as grid current is not drawn even when tube 10 is conducting. It should also be noted that tube 11 is normally conducting.) Control grid 33 will rise with this input to a critical value (fixed by the circuit constants) at which tube 10 begins to conduct and tube 11 is cut off (when proper conditions exist), which state continues until the input impulse falls below the starting voltage. As a result of such action, the output at anode 51 of tube 11 takes the form of a square wave of known amplitude which is operative to activate scaler circuits indicated by numerals 103, 104 and 105 and neon indicators 106, 107 and 108. The rectangular voltage wave generated at the plate of tube 11 is fed directly to the scaler unit 103 which feeds scaler units 104 etc. . . . 105. Scaler unit 105 may be of the type shown in Patent 2,442,403 and can be employed to drive tube 106 which operates a mechanical counter 107.

The passage of the constant frequency impulses through the pulse shaper circuit, including tubes 10 and 11, to the counter circuits is controlled in accordance with the principles of the present invention by varying the potential of grid 58. To this end, triode type tube 12 is provided and associated with tube 11 by having its cathode 79 directly connected to grid 58 of tube 11. Anode 78 of tube 12 is directly connected to conductor 40 and grid 73 is connected to ground through the alternative paths consisting of resistor 77 and switch 80 which is in the normally open position. The connection of tube 12 is termed for the purpose of the present specification as that of a cathode follower.

Conductivity or non-conductivity of tube 12, in addition to being dependent on the condition of switch 80 in a manner which will be apparent hereafter, is also dependent upon the condition of balance of the two mode system including tubes 14 and 15. These tubes are connected in the manner known as a trigger circuit, i. e., in which they operate in a stable mode of balance, or upon the application of a suitable signal, in an unstable mode of balance for a period dependent upon the network constants. More particularly, cathodes 86 and 87 are connected together and to ground through resistor 88. Control grid 81 of tube 14 is connected to ground through resistor 82 and control grid 89 receives its biasing potential through the connection to conductor 40 through resistor 90. Anode 70 is connected to conductor 40 through resistors 71 and 72 and anode 84 is connected to conductor 40 through resistor 92. The respective grids and anodes are cross connected in the usual manner, grid 89 being connected to the junction of resistors 71 and 72 through condenser 91, and grid 81 being connected to anode 84 through the network including resistor 83 and condenser 93.

Anode 70 is connected through the network including condenser 76 and resistor 74 to the control grid 73 of tube 12 and is also connected directly to anode 69 of tube 13, which serves as the input for the starting signal for the chronograph. An input terminal 59 is provided and connected through condenser 61 to control grid 62. Resistor 63 is connected between said grid 62 and ground. Cathode 64 is connected at the junction point of resistors 66 and 67 which are arranged in series between conductor 40 and ground. By-pass condenser 68 is provided in shunt with resistor 67.

An input is also provided for the stopping signal for the chronograph in the form of tube 16 and the terminal 60 associated through condenser 94 with the control grid 96 of said tube. Resistor 101 is connected between grid 96 and ground. Anode 102 is connected directly to anode 84 of tube 15 and cathode 97 is connected to the junction point of resistors 98 and 99 arranged in series between conductor 40 and ground. By-pass condenser 100 is provided in shunt with resistor 99.

Turning now to the operation of the circuit hereinabove described, the cyclically varying time base impulses applied between terminal 30 and ground causes grid 33 to be raised sufficiently to allow tube 10 to conduct and tube 11 to be cut off when the potential of grid 58 is at a proper level in accordance with the non-conductive condition of tube 12. Tube 10 will continue to conduct until the oscillatory input voltage falls below the critical starting value at which time the pulse shaping circuit, including tubes 10 and 11, returns to its stable state. Thus a square wave output may be accomplished at anode 51 of tube 11, which output is fed through conductor 17 to the counter circuit.

It is a feature of the present invention to vary the potential of grid 58 rapidly at predetermined times by controlling conduction of tube 12. Thus, with switch 80 in the open position, tube 12 is normally conducting and as a consequence of the direct connection of cathode 79 thereof to grid 58 of tube 11, cathodes 39 and 41 are maintained at a potential, relative to grid 33, such that tube 10 no longer conducts on any part of the oscillatory input. Consequently the current in tube 11 is not interrupted and no pulses appear at anode 51.

This condition is maintained until a predetermined positive signal is applied to terminal 59 and hence to grid 62 of tube 13. This signal, externally derived, is indicative of the beginning of the interval to be timed. Upon the appearance of the signal at grid 62 the potential of anode 69 is reduced and the negative signal thus produced is applied to control grid 73 and effects the cessation of conduction in tube 12. The cessation of conduction in tube 12 decreases the potential of cathode 79 and thereby the potential of grid 58 of tube 11. This reduces the amount of current flowing through tube 11 and thereby lowers the potential of cathodes 39 and 41, relative to grid 33. Tube 10 will now conduct on some portion of the oscillatory input and tube 11 is in condition to be cut off when the potential of grid 58 is lowered further by the action of anode 48 when tube 10 begins to conduct. Thus, periodic pulsations appear at grid 58 of tube 11 to effect operation of the counting circuits.

The same negative signal appearing at anode 69 is applied to grid 89 of tube 15, which reduces conduction in that tube, thereby increasing the potential at anode 84. Regenerative effects lower the potential at grid 89 of tube 15 until that tube is cut off and tube 14 is conducting. As a consequence of conduction in tube 14, grid 73 of tube 12 is held at a potential at which said tube 12 is prevented from conducting.

At the end of the interval being timed a second externally derived positive signal is applied to terminal 60 and through condenser 94 to grid 96 of tube 16. This signal raises grid 96 and thus lowers the potential at anode 102 and the resultant negative signal is applied to grid 81 of tube 14 effecting cut off of the same and the immediate return of the trigger circuit to its original stable state. Concomitantly, the sudden rise in potential of anode 69 is applied to grid 73 of tube 12 and said tube 12 again conducts whereby cathodes 39 and 41 are maintained at such a potential that tube 10 is prevented from conducting.

It should be noted that in the embodiment described the A. C. coupling constants, resistor 90 and condenser 91, of the trigger circuit, made up of tubes 14 and 15, are chosen so that the said circuit automatically returns from the unstable to the stable state after a predetermined time even if no terminating signal is applied to terminal 60. This predetermined time is fixed in excess of the time interval under observation. Thus the system is automatically reset after a timing operation and no indicating or like components, as well as manual resetting means are required to show the operative or inoperative condition obtaining in the system. It is clear that other benefits of the invention may be enjoyed independently of this feature.

The operation of the counting circuits is not described in detail herein as any well known circuits may be employed with the end result that the number of pulses (from the source associated with the terminal 30) between the initiating and terminating signals applied respectively to terminals 59 and 60 are counted and indicated, and the time interval between said signal determined. It is apparent that when switch 80 is closed, the operation of the counting circuits is carried out independently of externally derived timing pulses and thus may be manually activated or deactivated.

It should be noted that a particular advantage of the present system accrues from the manner in which the operation of tube 11 to pass activating signals is controlled to within fractions of a microsecond. It should be noted further the phase relationship of the shaped output pulses (activating signals) to the sine wave input pulses may be controlled independently of those circuit constants which control the timing interval.

It will thus be seen that what has been described herein is a simple chronograph system of high precision, featuring, in addition, automatic resetting characteristics. Many variations in the arrangement of the system, the type of trigger circuits or in the networks described will now be apparent to one skilled in the art without departing from the spirit and scope of the invention as defined in the appended claim.

What is claimed is:

A timing circuit comprising a one-shot multivibrator, an electronic counting circuit, a clamping circuit, and means for deactivating the clamping circuit for an interval determined by the successive occurrence of two input pulses, said one shot multivibrator comprising first and second thermionic tubes each having at least a cathode, a control grid and an anode, means for impressing wave energy of selected frequency on the grid of the first thermionic tube, said clamping tube having at least a cathode, control grid and anode, a load resistor connected to the cathode of the clamping tube and a connection between the clamping tube cathode and the one shot multivibrator second thermionic tube control grid, said means for deactivating the clamping circuit comprising a univibrator having first and second univibrator tubes each having at least an anode, control grid and cathode, means for impressing a working anode potential on each of the univibrator anodes, a connection between the univibrator first tube anode and the grid of the clamping tube, means for impressing a first input pulse on the univibrator to effect one state of equilibrium in which the said univibrator first tube anode has an elevated positive potential which is impressed on the clamping tube grid to reduce the impedance of the same to a low value to effectively short circuit the grid of the one shot multivibrator second tube and means for impressing a second input pulse on the univibrator to effect a state of lowered positive potential on the univibrator first tube anode to depress the control grid potential of the clamping tube to thereby open circuit the same and activate the one shot multivibrator to generate rectangular pulses in synchronism with the impressed input wave energy, and means coupling the rectangular pulses to the said electronic counting circuit.

WILLIAM A. HIGINBOTHAM.
BOYCE D. McDANIEL.

REFERENCES CITED

The following references are of record in the file of this patent:

UNITED STATES PATENTS

| Number | Name | Date |
| --- | --- | --- |
| 2,332,300 | Cook | Oct. 19, 1943 |
| 2,442,403 | Flory et al. | June 1, 1948 |
| 2,512,330 | Hendrich | June 20, 1950 |

OTHER REFERENCES

Abstract, 715,443, published July 19, 1949, filed Dec. 11, 1946.